Patented Aug. 5, 1947

2,425,201

UNITED STATES PATENT OFFICE 2,425,201

METHOD FOR PRODUCING ETHYNYL CARBINOLS

William Oroshnik, Brooklyn, N. Y., assignor to Ortho Pharmaceutical Corporation, a corporation of New Jersey No Drawing. Application September 11, 1945, Serial No. 615,691

2 Claims. (Cl. 260—631.5)

This invention relates to novel methods for producing organic compounds and more particularly to novel methods and steps in the methods for producing ethynyl carbinols. In one of its more specific aspects this invention is directed to novel methods for producing relatively high yields of ethynyl carbinols with an $\alpha\beta$-unsaturated ketone as a reactant.

Prior to this invention, Thompson and Gould reacted $\beta$-ionone with potassium acetylide to produce an ethynyl carbinol (J. A. C. S. 57, p. 340, 1935). The quantity of said carbinol produced was about 10% of theoretical. In 1944, Heilbron, a worker in this field, stated: "Although the literature abounds with references to the condensation of carbonyl compounds with acetylen, very few condensations involving $\alpha\beta$-unsaturated ketones have been described. We have found that such condensations are by no means easy to effect, the yields obtainable by the standard methods being usually poor and often negligible." (Heilbron, J. C. S. 1944, p. 144.) Recently Hennion—J. A. C. S. 66, p. 1289 (1944)— has reported a study of the reaction of sodium acetylide with $\alpha\beta$-unsaturated ketones. As the following table (taken from Hennion's paper) indicates, the average yield of ethynyl carbinol obtainable by reacting an $\alpha\beta$-unsaturated ketone with sodium acetylide is about 20–25% of theoretical.

| Carbonyl compound | Yield of ethynyl carbinol per cent of theory |
|---|---|
| Methyl vinyl ketone | 21 |
| Ethylideneacetone | 27 |
| Mesityl oxide | 24 |
| Benzalacetone | 20 |

In the course of my experiments with the production of ethynyl carbinols by reacting $\alpha\beta$-unsaturated ketones with various acetylides we have discovered that the substitution of calcium acetylide for the heretofore suggested sodium acetylide resulted in relatively high yields of said carbinols and in a low yield of polymerized material. The following table shows the yields of the various ethynyl carbinols obtained by reacting an $\alpha\beta$-unsaturated ketone with calcium acetylide. The method employed was substantially the same as the method set forth by Hennion, the only novelty being the use of calcium acetylide in place of sodium acetylide.

| Carbonyl compound | Yield of ethynyl carbinol per cent of theory |
|---|---|
| Methyl vinyl ketone | 71 |
| Ethylideneacetone | 78 |
| Mesityl oxide | 75 |
| Benzalacetone | 96 |
| $\beta$-ionone | 67 |
| Dibenzalacetone | 95 |

A comparison of the two tables clearly establishes that by practicing the present invention high yields of the ethynyl carbinols may be obtained.

According to this invention, calcium acetylide is reacted under anhydrous conditions with an $\alpha\beta$-unsaturated ketone having the following general formula

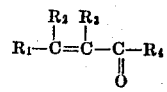

where $R_1$, and $R_2$ and $R_3$ may be hydrogen or any saturated or unsaturated hydrocarbon group, such as aryl, alkyl, or aralkyl, and $R_4$ may be any one of said hydrocarbon groups, and these hydrocarbon groups may be joined to each other in any fashion, forming a cyclic hydrocarbon system.

The $\alpha\beta$-unsaturated ketone is reacted with calcium acetylide in an inert solvent such as liquid $NH_3$, benzene, petroleum ether, naphtha, ethyl ether, dioxane, the "carbitol" ethers etc. The ratio of reactants may vary but ordinarily equimolecular quantities are used. The reaction proceeds as follows:

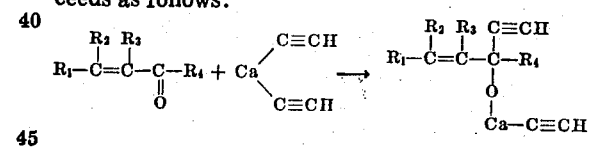

This reaction, which provides a novel reaction product, takes 1 to 3 hours when liquid ammonia is used as a solvent in the temperature range of $-70°$ C. to $-40°$ C. Then to said reaction mass is added water and acid resulting in hydrolysis of the aforesaid reaction product and the production of the ethynyl carbinol having the following general formula:

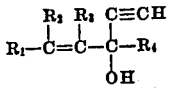

The calcium acetylide may be prepared in liquid ammonia. For example, 700 parts by weight of liquid ammonia may be mechanically stirred in a glass reaction vessel externally cooled by means of solid carbon dioxide or the like, to maintain the temperature of the liquid ammonia below −40° C. The liquid ammonia is maintained at said temperature while a swift stream of dry acetone-free acetylene gas is introduced to said liquid ammonia simultaneously with calcium metal turnings. Stirring of the mass and a moderate passage of acetylene are continued, after the introduction of all of the calcium metal, for a period of twenty minutes, while the temperature of the mass is maintained at −60° C. by intermittent additions of solid carbon dioxide to the cooling medium. By following this procedure, the calcium acetylide is formed and dispersed in the liquid ammonia solvent. Usually most of it is dissolved, but a good portion remains suspended in the liquid ammonia. This does not affect the reaction in any way.

For a fuller understanding of the nature and objects of the invention, reference should be made to the following examples which are given merely for further illustration of the invention and are not to be construed in a limiting sense. All parts are given by weight unless otherwise indicated.

*Example I*

Into said solution of calcium acetylide in said liquid ammonia, while said solution is continuously stirred and while acetylene is bubbled therethrough at a moderate rate, is added 70 parts (1 mole) of dry freshly distilled methyl vinyl ketone (boiling range 80° C.–83° C.) and the temperature of the mass is maintained at −55° C. for a period of 25 minutes. After this period and during the next 90 minutes, by passing of water over the exterior of the vessel or by any other desirable means, the temperature of the mass is increased until it has finally risen to about −5° C. in order to evaporate the ammonia therefrom. In the course of this rise in temperature, a total of about 300 parts of diethyl ether is added in portions to said mass in said vessel to maintain the desired fluidity. Subsequently, 300 parts of cold water are added slowly and in small increments followed by the addition of a 50% aqueous solution of acetic acid until the mass is just acid to litmus paper and the temperature is maintained preferably below 15° C. and at about 10° C., during these additions. Then, the stirring and passage of acetylene are stopped and the mass allowed to stand, whereupon it separates into two main layers, an ether layer and a water layer. The water layer is extracted twice with 100 parts of ether, the combined ether layers, are shaken with a dilute solution of sodium bicarbonate to remove the acetic acid, dried over anhydrous magnesium sulphate and then distilled after evaporation of ether. The distillate measures 68 parts of methyl vinyl ethynyl carbinol having a boiling point of 57.5° C.–59° C. at 60 mm. of mercury pressure, having an index of refraction at 20° C. of 1.4455 and giving negative tests for ketones. This yield represents 71% of theoretical.

*Example II*

Example I was repeated with the sole exception that instead of employing methyl vinyl ketone, 84 parts (1 mole) of dry freshly distilled ethylideneacetone (boiling range, 122° C.–124.5° C.) was employed. The distillate obtained was 86 parts of methyl propenyl ethynyl carbinol having a boiling point of 62° C. at 25 mm. of mercury pressure and an index of refraction at 20° C. of 1.4548. This yield represents 78% of theoretical.

*Example III*

Into the solution of calcium acetylide in liquid ammonia, which is continuously stirred while a moderate passage of acetylene is continued thereinto, is added 103 parts (1.05 mole) of dry mesityl oxide and the temperature of the mass is maintained between −40° C. and −50° C. for about 3 hours. Then while in said temperature range, there is added to said mass about 150 parts of ammonium acetate which is mixed therewith, and the addition of acetylene may be terminated. Then the temperature of the mass is increased until it has risen to about −5° C. in order to evaporate the ammonia therefrom. In the course of this rise in temperature, a total of about 300 parts of diethyl ether is added in portions to said mass in said vessel to maintain the desired fluidity. Subsequently, 300 parts of cold water are added slowly in small increments followed by the addition of a 50% aqueous solution of acetic acid until the mass is just acid to litmus paper and the temperature is maintained preferably at about 10° C. during these additions. The stirring is stopped and the mass is allowed to stand, whereby it separates into two main layers, an ether layer and a water layer. The water layer is extracted twice with 100 parts of ether. The combined ether layers are shaken with a dilute solution of sodium bicarbonate to remove the acetic acid, and dried over anhydrous magnesium sulphate. After evaporation of ether, the mass is distilled to separate the product from unreacted mesityl oxide obtaining a distillate of methyl isocrotyl ethynyl carbinol measuring 60 parts and having a boiling point 66° C.–69° C. at 18 mm. of mercury pressure and an index of refraction at 25.5° C. of 1.4608. This yield based on unrecovered mesityl oxide represents 75% of theoretical, since unreacted mesityl oxide measuring 40 parts, which may be used again, is recovered.

*Example IV*

Into the solution of calcium acetylide in liquid ammonia, which is continuously stirred and maintained at about −65° C., while a moderate passage of acetylene is continued thereinto, is added 146 parts (1 mole) of benzalacetone and the temperature of the mass is allowed to rise to about −50° C. over a period of one hour and then to −34° C. over the next half hour. Then while at said temperature of −34° C. there is added to said mass about 150 parts of ammonium acetate which is mixed therewith, and the addition of acetylene may be terminated. Then the temperature of the mass is increased until it has risen to about −5° C. in order to evaporate the ammonia therefrom. In the course of this rise in temperature, a total of about 600 parts of diethyl ether is added in portions to said mass in said vessel to maintain the desired fluidity. Subsequently, 300 parts of cold water are added slowly in small increments followed by the addition of a 50% aqueous solution of acetic acid until the mass is just acid to litmus paper and the temperature is maintained preferably at about 10° C. during these additions. The stirring is stopped and the mass is allowed to stand, whereby it separates into two main layers, an ether layer and a water layer. More water may be required to effect complete solution. The water layer is extracted once with 200 parts of ether. The combined ether layers are shaken with a dilute solution of sodium bicarbonate to remove the acetic acid, and dried over anhydrous magnesium sulphate. After evaporation of ether, the mass is distilled, obtaining a distillate of methyl styryl ethynyl carbinol measuring 165 parts and having a boiling point 132° C.–133° C. at 6.5 mm. of mercury pressure, and having a melting point of 49° C.–50° C. This yield represents 96% of theoretical.

If Example III is repeated with the exceptions that instead of employing mesityl oxide, 146 parts (1 mole) of benzalacetone are employed, and that 1400 parts of liquid ammonia are employed in the preparation of calcium acetylide, the yield of methyl styryl ethynyl carbinol is also 96% of the theoretical.

*Example V*

Into the solution of calcium acetylide in liquid ammonia, which is continuously stirred while a moderate passage of acetylene is continued thereinto, is added 192 parts (1 mole) of pure $\beta$-ionone having an index of refraction at 20° C. of 1.5206 and the temperature of the mass is maintained between −60° C. and −70° C. for about 3 hours. Then while in said temperature range, there is added to said mass about 150 parts of ammonium acetate which is mixed therewith, and the addition of acetylene may be terminated. Then the temperature of the mass is increased until it has risen to about −5° C. in order to evaporate the ammonia therefrom. In the course of this rise in temperature, a total of about 600 parts of diethyl ether is added in portions to said mass in said vessel to maintain the desired fluidity. Subsequently, 300 parts of cold water are added slowly in small increments followed by the addition of a 50% aqueous solution of acetic acid until the mass is just acid to litmus paper and the temperature is maintained preferably at about 10° C. during these additions. The stirring is stopped and the mass is allowed to stand, whereby it separates into two main layers, an ether layer and a water layer. More water may be required to effect complete solution. The water layer is extracted once with 200 parts of ether. The combined ether layers are shaken with a dilute solution of sodium bicarbonate to remove the acetic acid, and dried over anhydrous magnesium sulphate. After evaporation of ether, the mass is distilled, obtaining a distillate of unreacted $\beta$-ionone and $\alpha$-ethynyl $\beta$-ionol measuring 180 parts.

The $\beta$-ionone may be separated from the ethynyl carbinol in any one of a number of different ways and upon separation of said 180 parts of said mixture, 103 parts of the ethynyl carbinol and 57 parts of unreacted $\beta$-ionone are obtained. For example, the mixture of $\beta$-ionone and the ethynyl carbinol may be treated with substantially excessive amounts of semi-carbazide. This mixture of $\beta$-ionone and the ethynyl carbinol is dissolved in ethanol and this solution is treated with a concentrated aqueous solution of semi-carbazide. After mixing the two, a small amount of acetic acid is added and the mixture is allowed to stand for three days, and is then poured into a large volume of water whereby the $\beta$-ionone semicarbazone is precipitated as a solid and mixed with the ethynyl carbinol which is an oil. This mixture is shaken with petroleum ether whereby the ethynyl carbinol is selectively dissolved and the solid $\beta$-ionone semicarbazone remains suspended in this solution. The aqueous layer is separated and the petroleum ether mixture is filtered free of the semicarbazone, which is pure and has a melting point of 148° C.–149° C. The filtrate is freed of petroleum ether and distilled and the distillate, which is substantially completely $\alpha$-ethynyl $\beta$-ionol, measures 103 parts having a boiling point of 99° C.–100° C. at 0.65 mm. of mercury pressure, melting point about 15° C., index of refraction at 26.7° C. of 1.5008. The yield of said ethynyl carbinol based on unrecovered $\beta$-ionone is 67% of theoretical, since pure unreacted $\beta$-ionone, measuring 57 parts, which may be used again, is obtained from the semicarbazone.

*Example VI*

Example III is repeated with the exceptions that instead of employing mesityl oxide and 300 parts of diethyl ether, 234 parts (1 mole) of dibenzalacetone and 600 parts of ether are employed. The residue obtained after evaporation of ether is 247 parts of distyryl ethynyl carbinol, a solid which, after one recrystallization is colourless and has a melting point of 88° C.–88.5° C. This yield represents 95% of theoretical.

I claim:

1. The method for producing an ethynyl carbinol comprising reacting calcium acetylide with an $\alpha\beta$-unsaturated ketone under anhydrous conditions in an inert solvent and hydrolyzing the resultant organic reaction product.

2. The method for producing $\alpha$-ethynyl $\beta$-ionol comprising reacting calcium acetylide with $\beta$-ionone under anhydrous conditions in an inert solvent and hydrolyzing the resultant reaction product.

WILLIAM OROSHNIK.

REFERENCES CITED

The following references are of record in the file of this patent:

UNITED STATES PATENTS

| Number | Name | Date |
| --- | --- | --- |
| 1,999,110 | Ruzicka | Apr. 23, 1935 |
| 2,125,384 | Macallum | Aug. 2, 1938 |
| 2,232,867 | Reppe | Feb. 25, 1941 |
| 2,369,161 | Milas | Feb. 13, 1945 |